US 9,183,501 B2

(12) United States Patent
Bentley et al.

(10) Patent No.: US 9,183,501 B2
(45) Date of Patent: Nov. 10, 2015

(54) UPPER MERGED ONTOLOGY FOR IT ARCHITECTURE

(71) Applicant: International Business Machines Corporation, Armonk, NY (US)

(72) Inventors: Andrew J. Bentley, Canberra (AU); Rhonda L. Childress, Austin, TX (US); Christopher J. De Vaney, Dalgety (AU); Steven O. Twist, Sutherland (AU)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/892,261

(22) Filed: May 11, 2013

(65) Prior Publication Data

US 2014/0337273 A1 Nov. 13, 2014

(51) Int. Cl.
*G06N 5/02* (2006.01)

(52) U.S. Cl.
CPC . *G06N 5/022* (2013.01); *G06N 5/02* (2013.01)

(58) Field of Classification Search
CPC ....................................................... G06N 5/02
See application file for complete search history.

(56) References Cited

U.S. PATENT DOCUMENTS

| 7,487,166 B2 | 2/2009 | Angele et al. | |
| 2009/0199156 A1* | 8/2009 | Li et al. | 717/104 |

OTHER PUBLICATIONS

Kopena, J.; Regli, W.C., "DAMLJessKB: a tool for reasoning with the Semantic Web," Intelligent Systems, IEEE , vol. 18, No. 3, pp. 74,77, May-Jun. 2003.*
Robert Hoehndore et al., "Interoperability between Biomedical Ontologies through Relation Expansion, Upper-Level Ontologies and Automatic Reasoning", PLoS ONE vol. 6, Issue 7, Jul. 18, 2011, all pages (Publisher: PLoS ONE).

* cited by examiner

*Primary Examiner* — Jeffrey A Gaffin
*Assistant Examiner* — Ola Olude Afolabi
(74) *Attorney, Agent, or Firm* — Law Offices of Ira D. Clecker, P.C.

(57) ABSTRACT

An information technology (IT) architecture upper merged ontology which includes an upper merged ontology that is a representation framework for combined knowledge sources that are used in business and information technology; an upper merged ontology knowledge base containing information derived from an analysis of business and technical services pertaining to the IT architecture application; a plurality of semantic web application programming interfaces (APIs) that allow access to the upper merged ontology as a semantic web; a reasoning and constraint language (RaCL) that is a scripting language having the capabilities of model creation, automated reasoning and search and query operations such that scripts developed in the reasoning and constraint language can execute using the semantic web APIs; and a computer processor for representing and performing execution tasks.

15 Claims, 3 Drawing Sheets

UPPER MERGED ONTOLOGY FOR IT ARCHITECTURE

BACKGROUND

The present invention relates to a single, formalized IT architecture ontology which can absorb and reference knowledge from specialist ontologies.

Ontologies are the structural frameworks for organizing information and are used in artificial intelligence, the Semantic Web, systems engineering, software engineering, biomedical informatics, library science, enterprise bookmarking, and information architecture as a form of knowledge representation about the world or some part of it. The creation of domain ontologies is also fundamental to the definition and use of an enterprise architecture framework.

Contemporary ontologies share many structural similarities, regardless of the language in which they are expressed. As mentioned above, most ontologies describe individuals (instances), classes (concepts), attributes, and relations.

Common components of ontologies include:

Individuals: instances or objects (the basic or "ground level" objects).

Classes: sets, collections, concepts, classes in programming, types of objects, or kinds of thing.

Attributes: aspects, properties, features, characteristics, or parameters that objects (and classes) can have.

Relations: ways in which classes and individuals can be related to one another.

Function terms: complex structures formed from certain relations that can be used in place of an individual term in a statement.

Restrictions: formally stated descriptions of what must be true in order for some assertion to be accepted as input.

Rules: statements in the form of an if-then (antecedent-consequent) sentence that describe the logical inferences that can be drawn from an assertion in a particular form.

Axioms: assertions (including rules) in a logical form that together comprise the overall theory that the ontology describes in its domain of application. This definition differs from that of "axioms" in generative grammar and formal logic. In those disciplines, axioms include only statements asserted as a priori knowledge. As used here, "axioms" also include the theory derived from axiomatic statements.

Events: the changing of attributes or relations.

There are many partial ontologies for architectures in specialist areas, but they do not address the end-to-end knowledge management required for enterprise architecture integration.

BRIEF SUMMARY

The various advantages and purposes of the exemplary embodiments as described above and hereafter are achieved by providing, according to a first aspect of the exemplary embodiments, an information technology (IT) architecture upper merged ontology which includes: an upper merged ontology that is a representation framework for combined knowledge sources that are used in business and information technology, the upper merged ontology including a plurality of domain models for a given IT architecture application; an upper merged ontology knowledge base containing information derived from an analysis of business and technical services pertaining to the IT architecture application; a plurality of semantic web application programming interfaces (APIs) that allow access to the upper merged ontology as a semantic web; a reasoning and constraint language (RaCL) that is a scripting language having the capabilities of model creation, automated reasoning and search and query operations such that scripts developed in the reasoning and constraint language can execute using the semantic web APIs; and a computer processor for representing and performing execution tasks involving the upper merged ontology, the upper merged ontology knowledge base, the semantic APIs and the RaCL.

According to a second aspect of the exemplary embodiments, there is provided a method of developing an operational model for an IT architecture application which includes: developing an information technology (IT) architecture upper merged ontology for a given IT architecture application comprising:

an upper merged ontology that is a representation framework for combined knowledge sources that are used in business and information technology, the upper merged ontology including a plurality of business, architecture and service domain models;

an upper merged ontology knowledge base containing information derived from an analysis of business and technical services pertaining to the IT architecture application;

a plurality of semantic web APIs that allow access to the upper merged ontology as a semantic web; and a reasoning and constraint language (RaCL) that is a scripting language having the capabilities of model creation, automated reasoning and search and query operations such that scripts developed in the reasoning and constraint language can be executed through use of the semantic web APIs;

populating the upper merged ontology knowledge base with information derived from an analysis of business and technical services pertaining to the IT architecture application; executing RaCL processes to search the upper merged ontology knowledge base and extract knowledge pertaining to the IT architecture application and processing the results to generate dependency and interface relationships within an operational model domain ontology; creating an architecture for the IT architecture application from the operational model domain ontology, dependency and interface relationships; and a computer processor for performing the method.

According to a third aspect of the exemplary embodiments, there is provided a computer program product for developing an operational model for an IT architecture application which includes a non-transitory computer readable storage medium having computer readable program code embodied therewith. The computer readable program code includes: computer readable program code configured to develop an information technology (IT) architecture upper merged ontology for a given IT architecture application comprising:

an upper merged ontology that is a representation framework for combined knowledge sources that are used in business and information technology, the upper merged ontology including a plurality of business, architecture and service domain models;

an upper merged ontology knowledge base containing information derived from an analysis of business and technical services pertaining to the IT architecture application;

a plurality of semantic web APIs that allow access to the upper merged ontology as a semantic web; and a reasoning and constraint language (RaCL) that is a scripting language having the capabilities of model creation, automated reasoning and search and query operations such that scripts developed in the reasoning and constraint language can be executed through use of the semantic web APIs;

computer readable program code configured to populate the upper merged ontology knowledge base with information derived from an analysis of business and technical services pertaining to the IT architecture application; computer readable program code configured to execute RaCL processes to search the upper merged ontology knowledge base and extract knowledge pertaining to the IT architecture application and computer readable program code configured to process the results to generate dependency and interface relationships within an operational model domain ontology; and computer readable program code configured to create an architecture for the IT architecture application from the operational model domain ontology, dependency and interface relationships.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The exemplary embodiments relate to an upper merged ontology which supports knowledge representation and functionality for maintenance, constraint processing and reasoning from specialist ontologies.

In particular, the exemplary embodiments relate to an information technology (IT) architecture upper merged ontology including four principal components, namely, an upper merged ontology (UMO), an upper merged ontology knowledge base (UMOKB), semantic web applications and a reasoning and constraint language (RaCL).

The exemplary embodiments are directed to the following problems:

Integrating knowledge management for business architecture, IT architecture and subject-matter domain models to provide a unified superstructure view in the form of an Upper Merged Ontology (ITA/UMO).

Providing formal and semi-formal reasoning and constraint models to drive inference in the context of the ITA/UMO.

Providing a set of ontology models to support the knowledge representation and management in the related areas.

Providing a set of platform-neutral interface services to enable external systems to update, search and test inferences against a web or cloud-based ITA/UMO instance.

The UMO is a representation framework for combined knowledge sources that are used in business and information technology. The UMO includes a plurality of domain models for a given IT architecture application.

In the context of the exemplary embodiments, the UMO central knowledge representation is based on domain ontologies. A domain ontology (or domain-specific ontology) models a specific domain, which represents part of the world.

Particular meanings of terms applied to that specific domain are provided by domain ontology. For example the word card has many different meanings. An ontology about the domain of poker would model the "playing card" meaning of the word, while an ontology about the domain of computer hardware would model the "punched card" and "video card" meanings.

Figure 1:
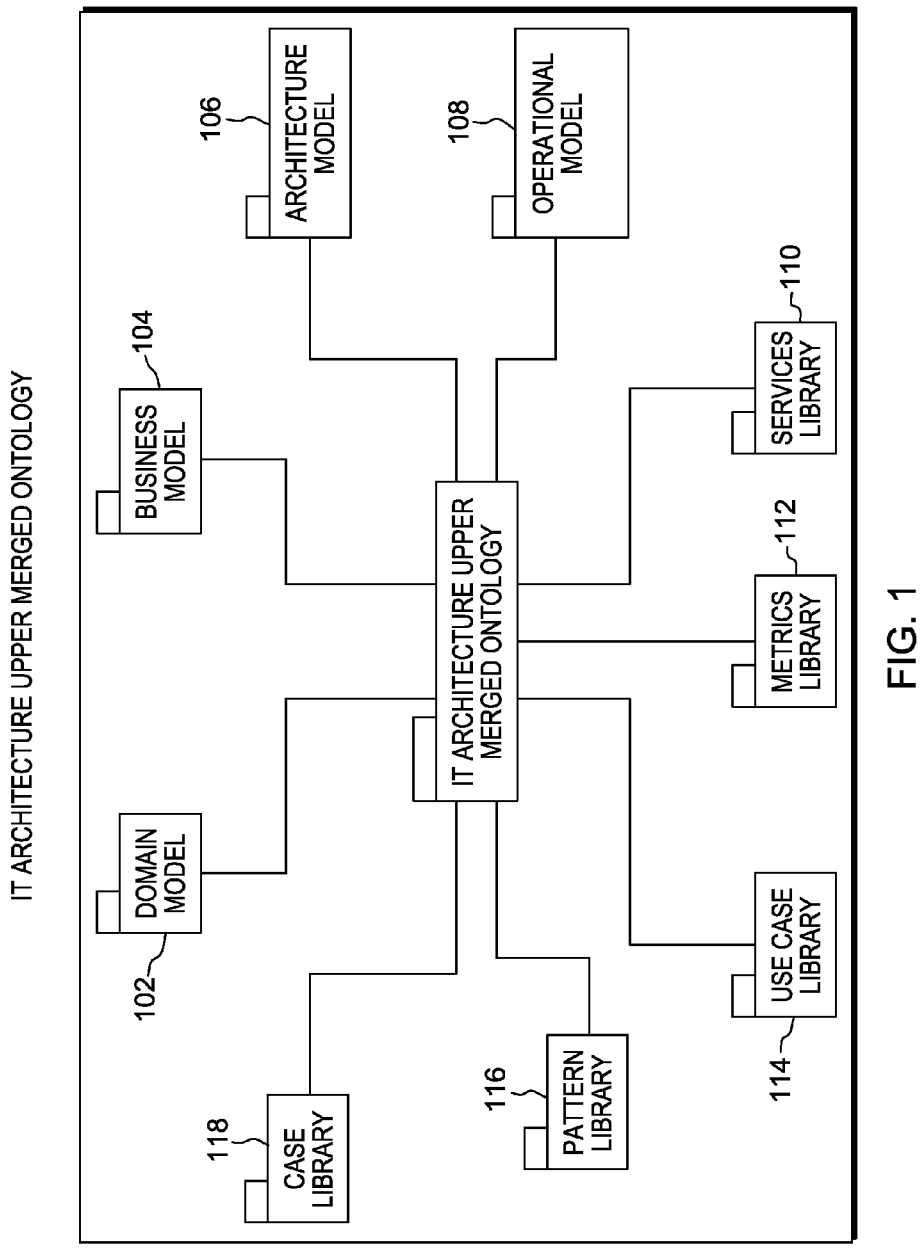
FIG. 1 is a graphical representation of the upper merger ontology of the IT architecture upper merged ontology.

A graphical representation of the UMO of the IT architecture UMO is illustrated in FIG. 1.

A number of domain ontologies may be provided to represent different facets of knowledge management in the specialist areas of the UMO, and to populate the UMO dimensions. The ontology templates as shown in FIG. 1 may be:

Domain Model 102: represents business or technical subject-matter knowledge in terms of Concepts, Events, Processes, Entities, Measures, Temporal and Spatial characteristics;

Business Model 104: facilitates business organization and strategic knowledge in terms of Organisation Models, Processes, Missions/Goals and Services;

IT Architecture Model 106: represents component elements and relationships of IT architectures in terms of Infrastructure, Systems, Applications, Services, Capabilities, Metrics, Computational and Network elements;

Operational Model 108: represents real-world systems at the operational level in terms of Locations, Nodes, Connectors, Components, Data and Transaction Flows;

Services Library 110: represents common descriptions of services in different domains, primarily technical and business;

Metrics Library 112: represents measurement indicators (Performance, Capacity, Risk, Life-Cycle, etc), their calculation and interpretations in the different domains;

Use Case Library 114: represents use cases and business processes in business and IT architecture contexts;

Pattern Library 116: represents problem-solving patterns, their implementations, constraints and usage in IT architecture;

Case Library 118: represents historical view of systems developments, pattern applications/results and experiences.

The above list of domain ontologies is not meant to be exclusive and for any given application, there may be additional domain ontologies. In a preferred exemplary embodiment, the domain model, IT architecture model, operational model, metrics library and pattern library may be the most significant domain ontologies and may be included in every UMO.

An upper ontology (or foundation ontology) is a model of the common objects that are generally applicable across a wide range of domain ontologies. It employs a core glossary that contains the terms and associated object descriptions as they are used in various relevant domain sets.

In the context of the exemplary embodiments, the Upper Merged Ontology component (UMO) is a representation framework for the combined knowledge sources which are used in business and IT architecture. The UMO is organized according to the following dimensions, which contain the core glossary for the IT architecture domains and references to the domain ontology concepts and objects which are relevant:

Subject-Matter Expertise (Domain Models, Services, Use-Cases, Metrics and Patterns)

Business Expertise (Business Models, Organizational Models, Services, Metrics and Business Processes)

IT Architecture Expertise (Operational Models, IT Architecture Models, Services, Patterns, Metrics, Cases)

Shown in FIG. 1 are the nine domain models representative of the exemplary embodiments. At this point, the UMO is just a framework as there may be no data filling each of the domains.

The IT architecture UMO further includes a UMOKB which contains information derived from an analysis of business and technical services pertaining to the application. Often, databases of relevant information can be read into the UMOKB. The UMOKB contains descriptions of the business and technical services defined in other source databases and knowledge bases, maintains relationship links between these elements and provides indices to the original definitions in the sources.

The IT architects working on the application need to develop an operational model as a basis for the IT architecture application. However, there is not yet an operational model to work from.

RaCL is designed as a platform for developing tools, as a scripting language and as a sublanguage in a logic programming environment. The IT architecture UMO further includes RaCL which has the capabilities of model creation, automated reasoning and search and query operations such that scripts developed in RaCL can execute using the semantic web APIs.

RaCL may execute processes to search the upper merged ontology knowledge base and extract knowledge pertaining to the IT architecture application and processing the results to generate dependency and interface relationships within an operational model domain ontology.

In the context of RaCL, model creation may include specifying views over the UMO for consideration, and applying search, reasoning and transformation algorithms to those views, automated reasoning may include generation of inferences over models in problem-solving and automated learning support, and search and query operations may include execution of search via relational, inference or pattern-matching over the knowledge in the UMO space.

RaCL is a functional language, with object-oriented capabilities and is extensible by use of "service" interfaces to specialist libraries or external systems. The current version of RaCL may be implemented in the Clojure Lisp and Java languages, with all API's implemented as Java class libraries. Programs and scripts developed in RaCL may be compiled to pure Java for distribution and execution. The currently supported programming syntax for RaCL is an extension of the Clojure syntax.

The IDE (integrated development environment) for RaCL is an editing, execution control and debugging tool which facilitates development of RaCL programs and scripts. The RaCL Runtime Environment is a highlevel interpreter which accesses the core environment for all key functions. It can also be used to launch a compiler for RaCL programs, which generate the equivalent Java implementations.

Figure 2:
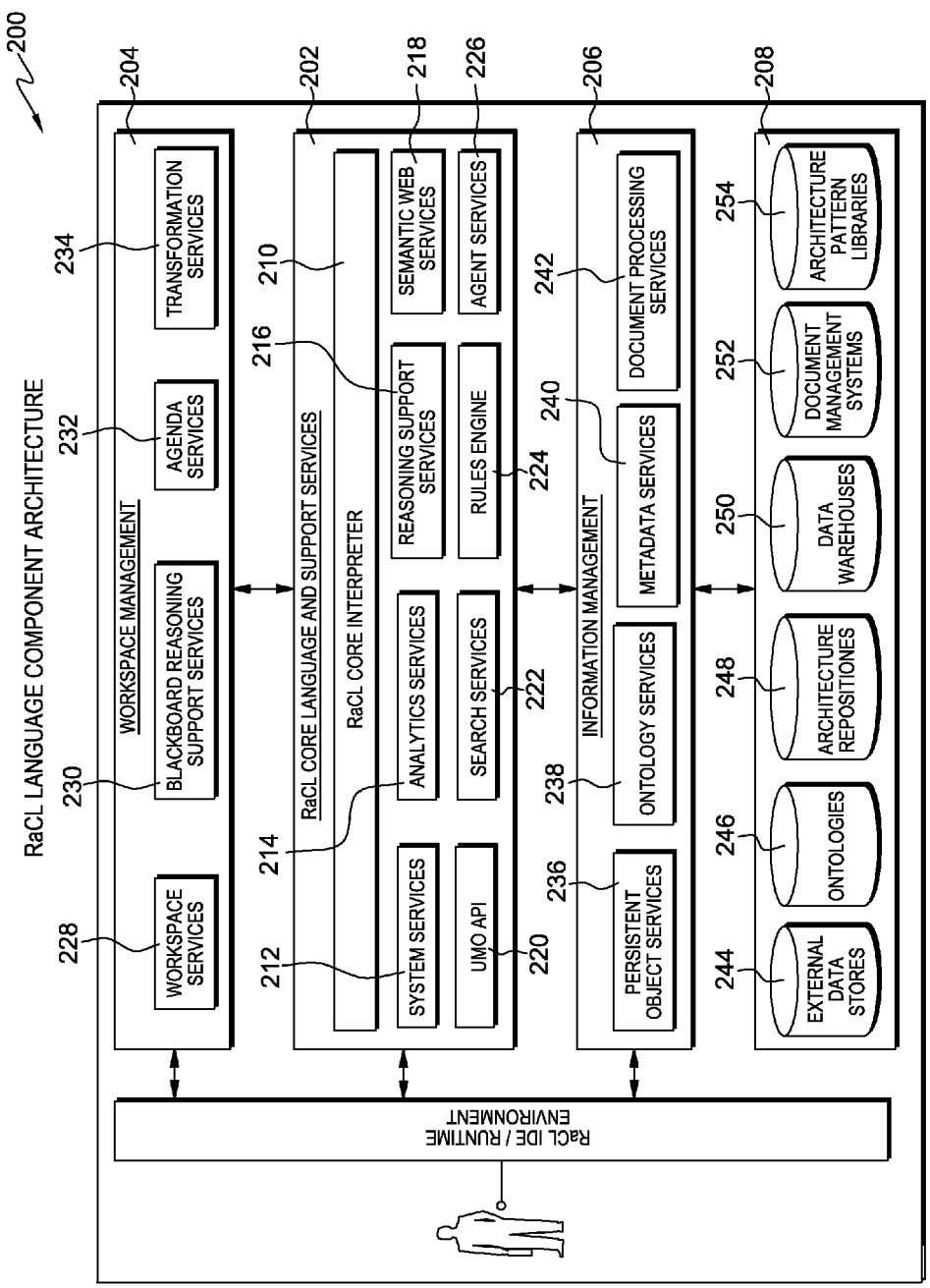
FIG. 2 is a graphical representation of the RaCL Language Component Architecture.

A graphical representation of the RaCL language component architecture 200 is illustrated in FIG. 2. The architecture may include the following components: Core Language and Support Services 202, Workspace Management 204, Information Management 206 and Integration with External Systems/Services 208. Each of these components is described in detail hereafter.

The RaCL Core Language and Support Services 202 provide the runtime execution functionality for RaCL programs and scripts and may be made up of the following elements:

RaCL Core Interpreter 210: the Core Interpreter is the execution engine for RaCL programs and scripts. It also handles scheduling, exception management, input/output operations and all memory management and housekeeping.

System Services 212: the System Services are a library of functions for interacting with the host operating system and for network communications.

Analytics Services 214: the Analytics Services library provides a set of internal functions to allow data analysis and statistical processes to be developed. It also provides a set of interfaces to the R statistics system.

Reasoning Support Services 216: the Reasoning Support Services are a set of functions that enable the setup and execution of problem solving workflows. This library is a control layer for the use of the Semantic Web, UMO API, Search and Rules libraries.

Semantic Web Services 218: the Semantic Web Services library provides a set of functions for analysis and manipulation of ontologies expressed in the OWL language. The ontologies may be locally stored, or located in the World Wide Web space.

UMO API 220: the UMO API provides an ontology interface, class factory, Java interfaces and complete methods for all entities defined within the scope of the UMO.

Search Services 222: the Search Service library provides a set of functions for navigating through the UMO and related ontologies, using the blackboard functions to preserve state information, and (optionally) under the control of the Agenda Services.

Rules Engine 224: the Rules Engine is a subsystem which enables rule production systems defined in RaCL models to be executed, based on either the RETE algorithm or an embedded DATALOG subset.

Agent Services 226: the Agent Services library provides functions for the definition and execution of software agents defined in the RaCL language.

The Workspace Management 204 component of RaCL provides support for memory operations, for both normal operations and for reasoning support, and may include the following elements.

Workspace Services 228: the Workplace Services library provides functions for creating, accessing and deleting variable and object definitions during runtime.

Blackboard Reasoning Support Services 230: the Blackboard Reasoning Support Services provide a memory model and functions to support blackboard operations in running RaCL programs and reasoning/evaluation tasks. The functions allow information collected from agents to be shared between all running processes.

Agenda Services 232: the Agenda Services library provides a scheduler memory model and functions to support control of complex reasoning processes.

Transformation Services 234: the Transformation Services library provides a memory space and functions to support representation transformation of knowledge or information. Example: OWL representation of an operational model to UML.

The Information Management 206 component of RaCL provides support for interfaces to databases, data stores, ontologies and document management systems that may be hosted locally to the RaCL runtime environment, or distributed over networks or the Web and may include the following elements.

Persistent Object Services 236: the PO services provide a set of interfaces for the RaCL interpreter to store, retrieve and manage information in external data stores. These stores include relational databases, NoSQL databases and Hadoop file systems.

Ontology Services 238: the Ontology Services provide a library of functions for connecting to ontologies—either on the Web or locally stored—and managing query and update activities. These are important for the support of the Semantic Web Services.

Metadata Services 240: the Metadata Services library provides functions for management of metadata with respect to UMO processing, particularly when enriching KB contents with annotations. It may use local metadata databases, or those hosted external to the environment.

Document Processing Services 242: the Document Processing Services library provides a set of functional interfaces to external documentation management systems for storage, retrieval or editing processes.

Still referring to FIG. 2, the RaCL Language Component Architecture may integrate with External Systems/Services 208 such as External Data Stores 244, external Ontologies 246, Architecture Repositories 248, Data Warehouses 250, Document Management Systems 252 and Architecture Pattern Libraries 254.

The IT architecture UMO further includes semantic web APIs to allow access to the UMO as a semantic web. A semantic web provides a common framework that allows specialist data to be shared and reused across application, enterprise and community boundaries.

The Semantic Web API is a Java library that allows any using application to access the UMO as a Semantic Web, according to the W3C (World Wide Web Consortium) classification. The library may provide functionality for creation and update of knowledge elements in the UMO or related ontologies; search and retrieval via pattern-matching, relational or inferential search; evaluation of logical or reasoning operations against elements of the UMO or related ontologies which includes enforcing or testing constraints inherent in the ontology models; and execution of RaCL models or functions, and return of the results. The API's object model may use the UMO class model, and include a number of transformation tools to allow information retrieved from the UMO to be mapped into other notations and languages, for example XML and UML notations.

The UMO may use the OWL (Web Ontology Language) and RDF (resource description framework) as the core representation notations. The constraints (types, allowed relationships and inferences) may be described within the context of the OWL notation. They are accessible to the RaCL and any other tool which can parse the OWL notation.

Finally, an IT architecture for the application may be created from the operational model domain ontology, dependency and interface relationships.

Figure 3:
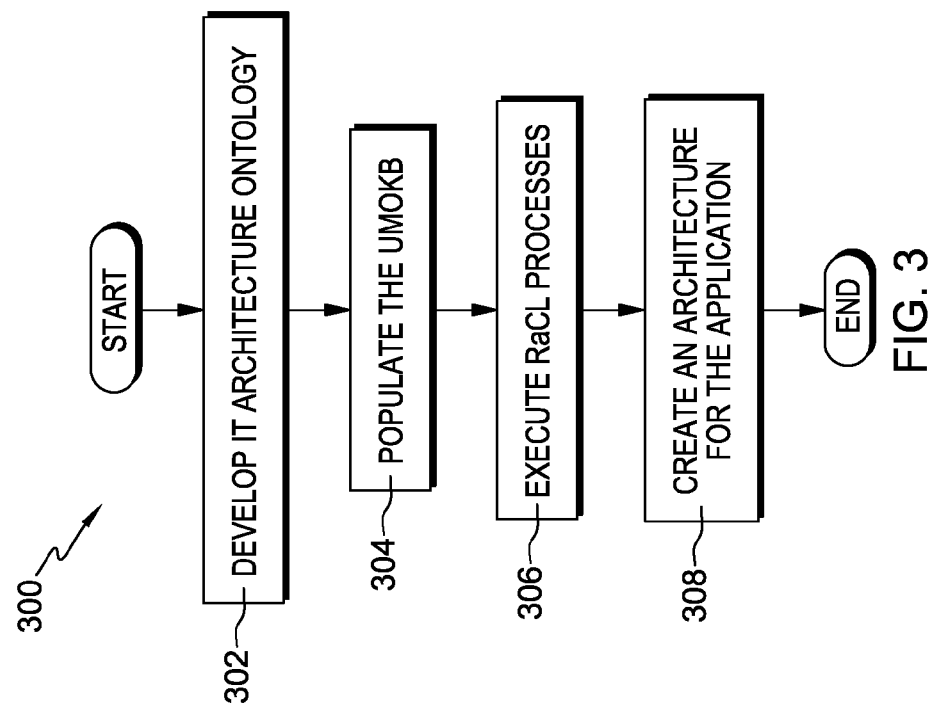
FIG. 3 is a flow chart of an exemplary method for developing an operational model for an IT architecture application.

There is also an exemplary embodiment of a method disclosed as illustrated in FIG. 3. The method 300 pertains to developing an operational model for an IT architecture application. In a first step of the method 300, box 302, an information technology (IT) architecture ontology for a given application is developed. The IT architecture ontology may comprise the IT architecture ontology discussed previously which includes an upper merged ontology (UMO), an upper merged ontology knowledge base (UMOKB), a plurality of semantic web APIs and a reasoning and constraint language (RaCL).

Thereafter, the UMOKB is populated with information derived from an analysis of business and technical services pertaining to the IT architecture application, box 304. The UMOKB may be populated, in one exemplary embodiment, by reading relevant databases directly into the UMOKB.

Then, RaCL processes may be executed to search the upper merged ontology knowledge base and extract knowledge pertaining to the IT architecture application and processing the results to generate dependency and interface relationships within an operational model domain ontology, box 306.

Finally, as shown in box 308, an architecture for the application may be created from the operational model domain ontology, dependency and interface relationships.

The exemplary embodiments have the following advantages:

Enables collaborative business analysis and IT architecture practice across WAN, Web or Cloud-based.

Integrates multiple knowledge sources into a common ontology which relates Business, Domain and IT Architecture knowledge in multiple dimensions.

Allows coupling of disparate architecture and system design tools across distributed environments.

Allows reasoning and design constraint modelling in the context of problem solving.

Figure 4:
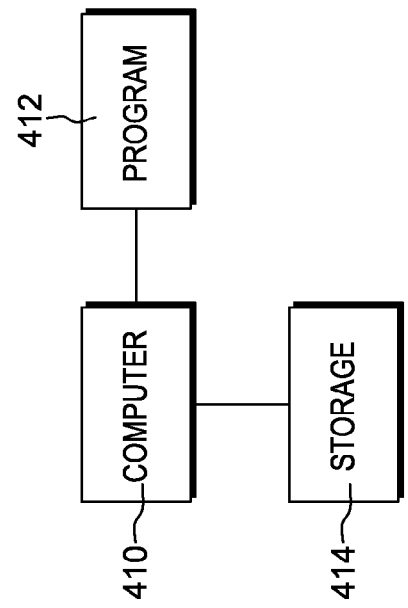
FIG. 4 is a block diagram illustrating an exemplary hardware environment for the exemplary embodiments.

The computing devices implementing the exemplary embodiments may be a general-purpose computer or a special purpose computing device such as a hand-held computer. FIG. 4 is a block diagram that illustrates one exemplary hardware environment of the computing devices. The exemplary embodiments may be implemented using a computer 410 comprised of microprocessor means, random access memory (RAM), read-only memory (ROM) and other components. The computer 410 may be a personal computer, server, mainframe computer, hand-held device or other computing device. Resident in the computer 410, or peripheral to it, may be a storage device 414 of some type such as a hard disk drive, floppy disk drive, CD-ROM drive, tape drive or other storage device.

Generally speaking, the software implementation of the exemplary embodiments, program 412 in FIG. 4, may be tangibly embodied in a computer-readable medium such as one of the storage devices 414 mentioned above. The program 412 may comprise instructions which, when read and executed by the microprocessor of the computer 410, may cause the computer 410 to perform the steps necessary to execute the steps or elements of the exemplary embodiments.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. An information technology (IT) architecture upper merged ontology comprising:
    an upper merged ontology that is a representation framework for combined knowledge sources that are used in business and information technology, the upper merged ontology including a plurality of domain models for a given IT architecture application;
    an upper merged ontology knowledge base containing information derived from an analysis of business and technical services pertaining to the IT architecture application;
    a plurality of semantic web application programming interfaces (APIs) that allow access to the upper merged ontology as a semantic web;
    a reasoning and constraint language (RaCL) that is a scripting language having the capabilities of model creation, automated reasoning and search and query operations such that scripts developed in the reasoning and constraint language can execute using the semantic web APIs; and
    a computer processor for representing and performing execution tasks involving the upper merged ontology, the upper merged ontology knowledge base, the semantic APIs and the RaCL.

2. The IT architecture ontology of claim 1 wherein the plurality of domain models include:

a domain model representing business or technical subject matter knowledge in a plurality of domains;
an IT architecture model representing component elements and relationships of IT architectures;
an operational model representing real-world systems at an operational level;
a metrics library representing measurement indicators, their calculation and interpretations in the different domains; and
a pattern library representing problem-solving patterns, their implementations, constraints and usage in IT architecture.

3. The IT architecture ontology of claim 1 wherein the plurality of domain models include:
a domain model representing business or technical subject matter knowledge in a plurality of domains;
a business model facilitating business organization and strategic knowledge;
an IT architecture model representing component elements and relationships of IT architectures;
an operational model representing real-world systems at an operational level;
a services library representing common descriptions of services in different domains;
a metrics library representing measurement indicators, their calculation and interpretations in the different domains;
a use case library representing use cases and business processes in business processes in business and IT architecture contexts;
a pattern library representing problem-solving patterns, their implementations, constraints and usage in IT architecture; and
a case library representing an historical view of systems developments, pattern application, results and experiences.

4. The IT architecture ontology of claim 1 wherein the plurality of semantic web APIs provide functionality for creation and update of knowledge elements in the upper merged ontology, search and retrieval, evaluation of logical or reasoning operations against elements of the upper merged ontology and execution of RaCL models or functions and return of the results.

5. The IT architecture ontology of claim 1 wherein the RaCL provides the following capabilities using the upper merged ontology, the domain models and the semantic web APIs: model creation, automated reasoning and search and query operations.

6. A method of developing an operational model for an IT architecture application comprising:
developing an information technology (IT) architecture upper merged ontology for a given IT architecture application comprising:
an upper merged ontology that is a representation framework for combined knowledge sources that are used in business and information technology, the upper merged ontology including a plurality of business, architecture and service domain models;
an upper merged ontology knowledge base containing information derived from an analysis of business and technical services pertaining to the IT architecture application;
a plurality of semantic web APIs that allow access to the upper merged ontology as a semantic web; and
a reasoning and constraint language (RaCL) that is a scripting language having the capabilities of model creation, automated reasoning and search and query operations such that scripts developed in the reasoning and constraint language can be executed through use of the semantic web APIs;
populating the upper merged ontology knowledge base with information derived from an analysis of business and technical services pertaining to the IT architecture application;
executing RaCL processes to search the upper merged ontology knowledge base and extract knowledge pertaining to the IT architecture application and processing the results to generate dependency and interface relationships within an operational model domain ontology;
creating an architecture for the IT architecture application from the operational model domain ontology, dependency and interface relationships; and
a computer processor for performing the method.

7. The method of claim 6 wherein the plurality of domain models include:
a domain model representing business or technical subject matter knowledge in a plurality of domains;
an IT architecture model representing component elements and relationships of IT architectures;
an operational model representing real-world systems at an operational level;
a metrics library representing measurement indicators, their calculation and interpretations in the different domains; and
a pattern library representing problem-solving patterns, their implementations, constraints and usage in IT architecture.

8. The method of claim 6 wherein the plurality of domain models include:
a domain model representing business or technical subject matter knowledge in a plurality of domains;
a business model facilitating business organization and strategic knowledge;
an IT architecture model representing component elements and relationships of IT architectures;
an operational model representing real-world systems at an operational level;
a services library representing common descriptions of services in different domains;
a metrics library representing measurement indicators, their calculation and interpretations in the different domains;
a use case library representing use cases and business processes in business processes in business and IT architecture contexts;
a pattern library representing problem-solving patterns, their implementations, constraints and usage in IT architecture; and
a case library representing an historical view of systems developments, pattern application, results and experiences.

9. The method of claim 6 wherein the plurality of semantic web APIs provide functionality for creation and update of knowledge elements in the upper merged ontology, search and retrieval, evaluation of logical or reasoning operations against elements of the upper merged ontology and execution of RaCL models or functions and return of the results.

10. The method of claim 6 wherein the RaCL provides the following capabilities using the upper merged ontology, the domain models and the semantic web APIs: model creation, automated reasoning and search and query operations.

11. A computer program product for developing an operational model for an IT architecture application comprising:

a non-transitory computer readable storage medium having computer readable program code embodied therewith, the computer readable program code comprising:

computer readable program code configured to develop an information technology (IT) architecture upper merged ontology for a given IT architecture application comprising:
- an upper merged ontology that is a representation framework for combined knowledge sources that are used in business and information technology, the upper merged ontology including a plurality of business, architecture and service domain models;
- an upper merged ontology knowledge base containing information derived from an analysis of business and technical services pertaining to the IT architecture application;
- a plurality of semantic web APIs that allow access to the upper merged ontology as a semantic web; and
- a reasoning and constraint language (RaCL) that is a scripting language having the capabilities of model creation, automated reasoning and search and query operations such that scripts developed in the reasoning and constraint language can be executed through use of the semantic web APIs;

computer readable program code configured to populate the upper merged ontology knowledge base with information derived from an analysis of business and technical services pertaining to the IT architecture application;

computer readable program code configured to execute RaCL processes to search the upper merged ontology knowledge base and extract knowledge pertaining to the IT architecture application and computer readable program code configured to process the results to generate dependency and interface relationships within an operational model domain ontology; and computer readable program code configured to create an architecture for the IT architecture application from the operational model domain ontology, dependency and interface relationships.

12. The computer program product of claim 11 wherein the plurality of domain models include:
- a domain model representing business or technical subject matter knowledge in a plurality of domains;
- an IT architecture model representing component elements and relationships of IT architectures;
- an operational model representing real-world systems at an operational level;
- a metrics library representing measurement indicators, their calculation and interpretations in the different domains; and
- a pattern library representing problem-solving patterns, their implementations, constraints and usage in IT architecture.

13. The computer program product of claim 11 wherein the plurality of domain models include:
- a domain model representing business or technical subject matter knowledge in a plurality of domains;
- a business model facilitating business organization and strategic knowledge;
- an IT architecture model representing component elements and relationships of IT architectures;
- an operational model representing real-world systems at an operational level;
- a services library representing common descriptions of services in different domains;
- a metrics library representing measurement indicators, their calculation and interpretations in the different domains;
- a use case library representing use cases and business processes in business processes in business and IT architecture contexts;
- a pattern library representing problem-solving patterns, their implementations, constraints and usage in IT architecture; and
- a case library representing an historical view of systems developments, pattern application, results and experiences.

14. The computer program product of claim 11 wherein the plurality of semantic web APIs provide functionality for creation and update of knowledge elements in the upper merged ontology, search and retrieval, evaluation of logical or reasoning operations against elements of the upper merged ontology and execution of RaCL models or functions and return of the results.

15. The computer program product of claim 11 wherein the RaCL provides the following capabilities using the upper merged ontology, the domain models and the semantic web APIs: model creation, automated reasoning and search and query operations.

* * * * *